Dec. 15, 1959 A. KIPNIS 2,917,008
DEEP-FRIED EXTRUDED-DOUGH COMESTIBLE MACHINE
Filed Dec. 12, 1955 7 Sheets-Sheet 1

INVENTOR.
ABRAHAM KIPNIS
BY
ATTORNEY

Dec. 15, 1959 A. KIPNIS 2,917,008
DEEP-FRIED EXTRUDED-DOUGH COMESTIBLE MACHINE
Filed Dec. 12, 1955 7 Sheets-Sheet 3

INVENTOR.
ABRAHAM KIPNIS
BY
ATTORNEY

Dec. 15, 1959  A. KIPNIS  2,917,008
DEEP-FRIED EXTRUDED-DOUGH COMESTIBLE MACHINE
Filed Dec. 12, 1955  7 Sheets-Sheet 4

INVENTOR.
ABRAHAM KIPNIS
BY
ATTORNEY

Dec. 15, 1959        A. KIPNIS        2,917,008
DEEP-FRIED EXTRUDED-DOUGH COMESTIBLE MACHINE
Filed Dec. 12, 1955                    7 Sheets-Sheet 5

INVENTOR.
ABRAHAM KIPNIS
BY
ATTORNEY

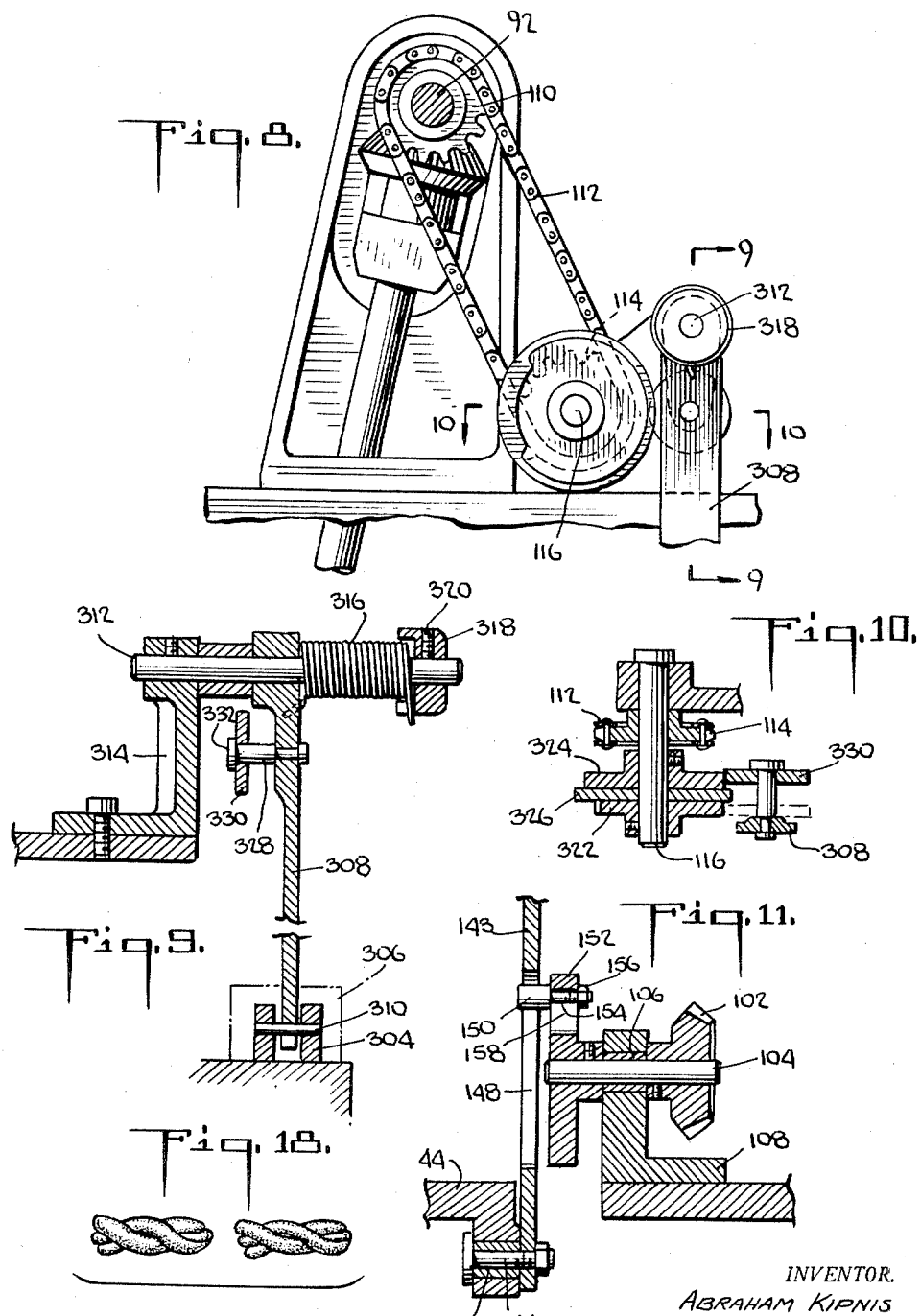

Dec. 15, 1959 A. KIPNIS 2,917,008
DEEP-FRIED EXTRUDED-DOUGH COMESTIBLE MACHINE
Filed Dec. 12, 1955 7 Sheets-Sheet 7
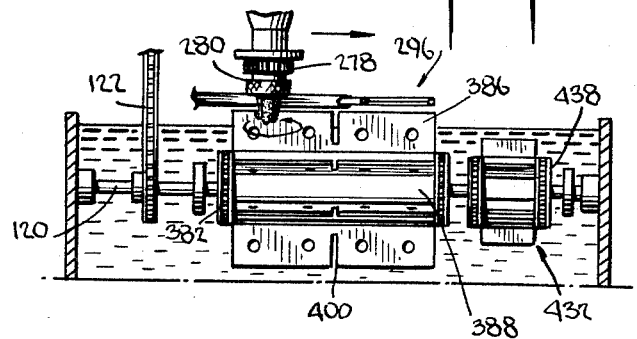
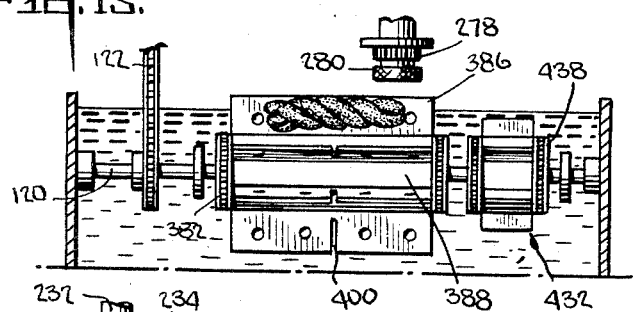
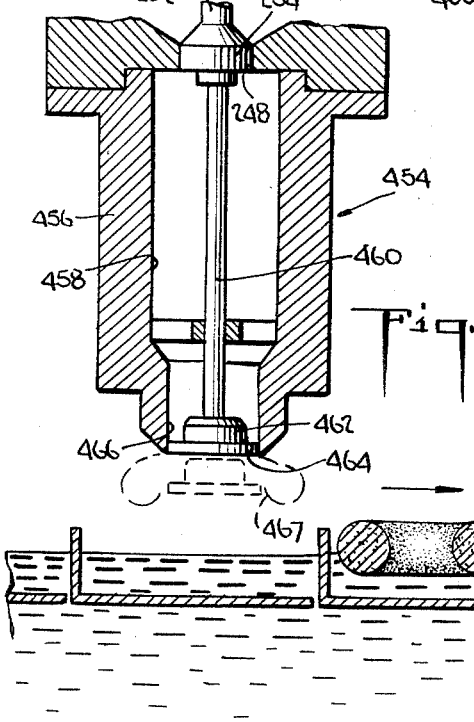
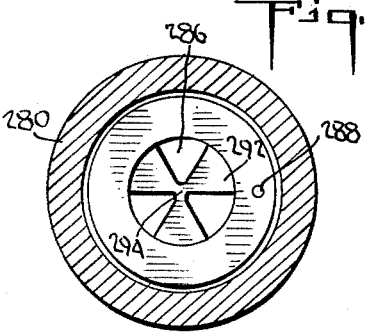
INVENTOR.
ABRAHAM KIPNIS
BY
ATTORNEY United States Patent Office 2,917,008
Patented Dec. 15, 1959

2,917,008

DEEP-FRIED EXTRUDED-DOUGH COMESTIBLE MACHINE

Abraham Kipnis, Forest Hills, N.Y.

Application December 12, 1955, Serial No. 552,343

6 Claims. (Cl. 107—14)

This invention relates to a deep-fried extruded-dough comestible machine.

More particularly, my invention relates to an improved machine for extruding uncooked comestibles of soft dough which during or immediately after extrusion are dropped into a hot dough frying bath, the dough being so soft that it cannot maintain its extruded shape if supported on a solid flat surface.

In general, it is an object of my invention to provide a machine of the character described which is versatile in operation, being able to make, for example, various kinds of twisted crullers and doughnuts as well as crullers of varying lengths, without undue complexity of equipment.

In connection with the foregoing, it is an ancillary object of my invention to provide a machine of the character described in which a long one-piece or multi-stranded strip of soft extruded dough is severed intermediate its ends prior to deposition in a deep-frying bath whereby various lengths of comestibles may be obtained with comparatively simple apparatus and whereby plural uncooked comestibles can be formed in a single pass of a moving extruding head.

It is another ancillary object of the above feature of my invention to provide a machine of the character described in which the extruding head moves in a straight line so that a strip of extruded dough can be separated into plural parts and deep fried without unduly expanding the apparatus and introducing complex severing mechanisms.

It is another object of my invention to provide a machine of the character described in which deep-fried comestibles, after being fried on one side, are turned upside down in a novel manner which requires only simple parts and does not leave marks on the finished comestibles.

It is another object of my invention to provide a machine of the character described which can make either crullers or doughnuts in either one or more production lines at the same or different times.

It is another object of my invention to provide a machine of the character described in which the same hopper and extrusion pump can be used to make crullers or doughnuts.

It is another object of my invention to provide a versatile machine of the foregoing character having particularly compact comestible-forming and frying sections.

It is another object of my invention to provide an improved extrusion pump which is more positive in its pumping action and more accurate in its metering and which is easier to disassemble, clean, repair and adjust than previous extrusion pumps.

It is another object of my invention to provide a machine of the character described having a simplified drive for the various parts whereby the apparatus is less susceptible to breakdown and is speedier in production.

It is another object of my invention to provide a machine of the character described having an improved frying tank which is easy to clean and which keeps comestible fragments away from the hotter parts of the frying liquid where they may become carbonized and difficult to remove.

It is another object of my invention to provide a machine of the character described which can be quickly and simply adjusted to make any desired size and weight of cruller or doughnut.

It is another object of my invention to provide a machine of the character described which is highly compact and efficient in operation.

It is another object of my invention to provide a machine of the character described having an improved conveyor mechanism for the comestibles during submerged frying thereof and which reduces the pressure required to force the comestibles through the hot frying bath and thereby minimizes the tendency to leave unsightly marks on the finished product.

It is another object of my invention to provide a machine for making comestibles of the character described which will substantially reduce the cost of such articles and will improve their appearance and uniformity.

It is another object of my invention to provide a machine for making a novel comestible employing several twisted strands rather than only the two heretofore produced.

Other objects of my invention in part will be obvious and in part will be pointed out hereinafter.

My invention accordingly consists in the features of construction, combinations of elements, arrangements of parts and series of steps which will be exemplified in the machine described hereinafter and of which the scope of application will be indicated in the appended claims.

In the accompanying drawings in which are shown various possible embodiments of my invention, Fig. 1 is a side view, partly in section, of a machine constructed in accordance with my present invention, the same being illustrated as set up to produce twisted crullers;

Fig. 5 is a sectional view taken substantially along the line 5—5 of Fig. 4, the same being explanatory of the cams which control operation of the extrusion pump;

Fig. 6 is a sectional view taken substantially along the line 6—6 of Fig. 5, the same being explanatory of the valve control for the extrusion pump;

Fig. 8 is an enlarged sectional view taken substantially along the line 8—8 of Fig. 2, the same being explanatory of the kinematic drive for the cutting mechanism that performs a selectable number of cuts on a ribbon of soft dough as it is extruded and before it is deposited in the hot frying bath;

Figure 2:
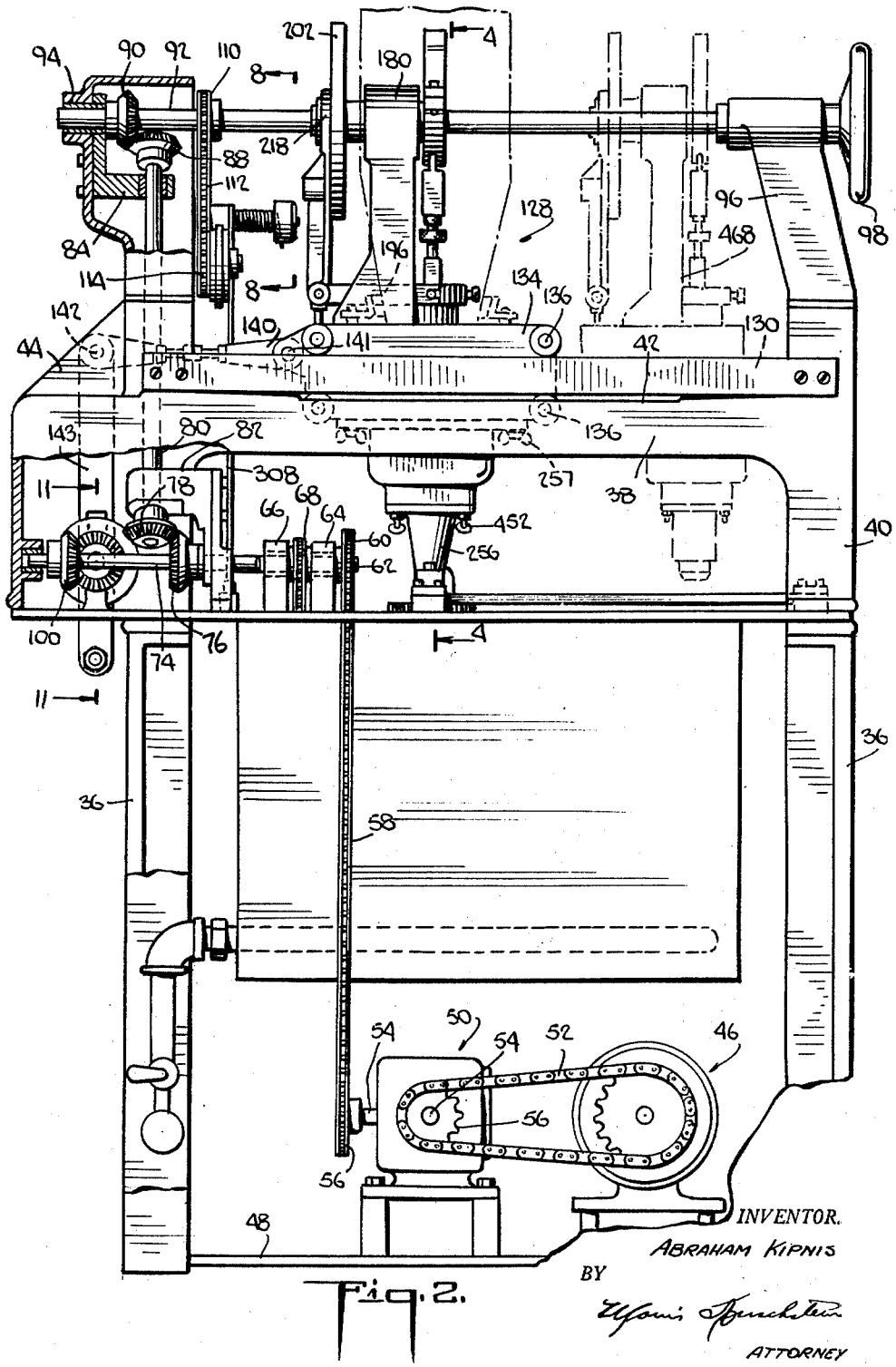
Fig. 2 is an enlarged end view, partly in section, of the machine shown in Fig. 1.
Figure 7:
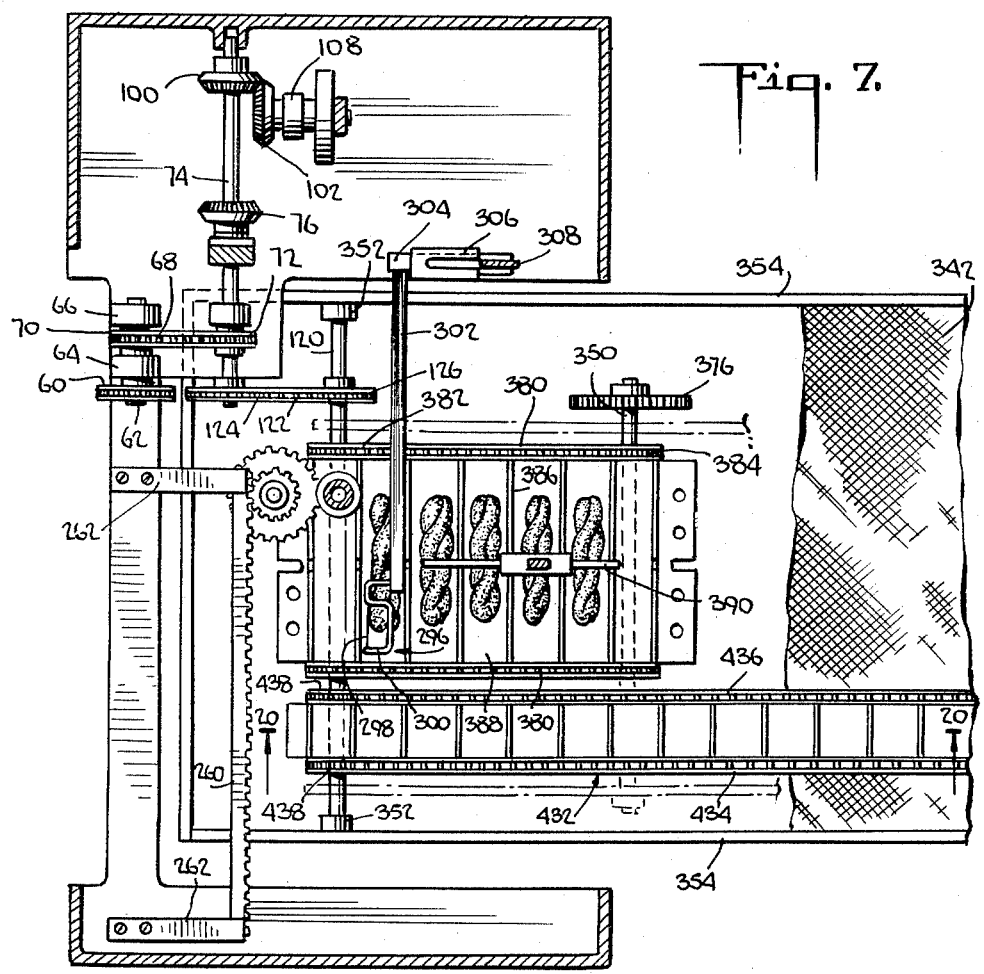
Fig. 7 is a fragmentary sectional view of the apparatus taken substantially along the line 7—7 of Fig. 1, the same illustrating the construction of the deep-fry conveyor near the extrusion pump.
Figures 16, 17:
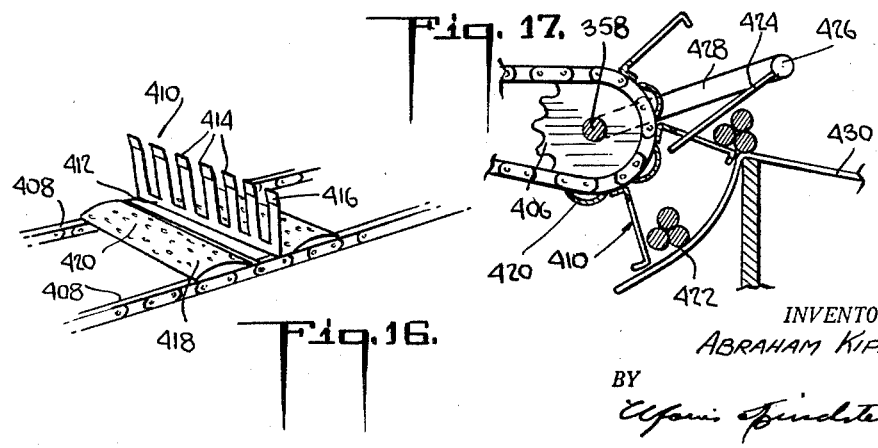

Figs. 9 and 10 are sectional views taken substantially along the lines 9—9 and 10—10, respectively, of Fig. 8, the same being explanatory of other details of the aforesaid drive;

Fig. 11 is an enlarged sectional view taken substantially along the line 11—11 of Fig. 2, the same being explanatory of the drive for the extrusion head;

Fig. 12 is a fragmentary axial sectional view of a dough extrusion nozzle adapted to simultaneously extrude several ribbons of soft dough in juxtaposed relationship;

Fig. 13 is a sectional view taken substantially along the line 13—13 of Fig. 12;

Fig. 14 is a detail view showing the extrusion nozzle at the start of an extrusion pass;

Fig. 15 is a view similar to Fig. 14 but showing the nozzle at the end of an extrusion pass;

Fig. 16 is a perspective view of one of the pusher elements on the top flight of the upper conveyor;

Fig. 17 is an enlarged longitudinal sectional view through the upper conveyor at the delivery end of the machine;

Fig. 18 is a top view of a pair of cooked twisted crullers embodying my invention;

Fig. 19 is an enlarged sectional view through the extrusion pump set up to make doughnuts; and Fig. 20 is a longitudinal sectional view through the doughnut conveyor, the same being taken substantially along the line 20—20 of Fig. 7.

Referring now in detail to the drawings, the reference numeral 30 denotes a machine constructed in accordance with my invention. Said machine essentially constitutes two portions, i.e. sections, to wit, an extrusion section 32 in which the soft-dough uncooked comestibles are formed and a cooking section 34 in which the aforesaid comestibles initially are floated on top of a hot liquid in a deep-fry tank, subsequently are turned upside down and submerged in the liquid and finally are discharged.

Figure 3:
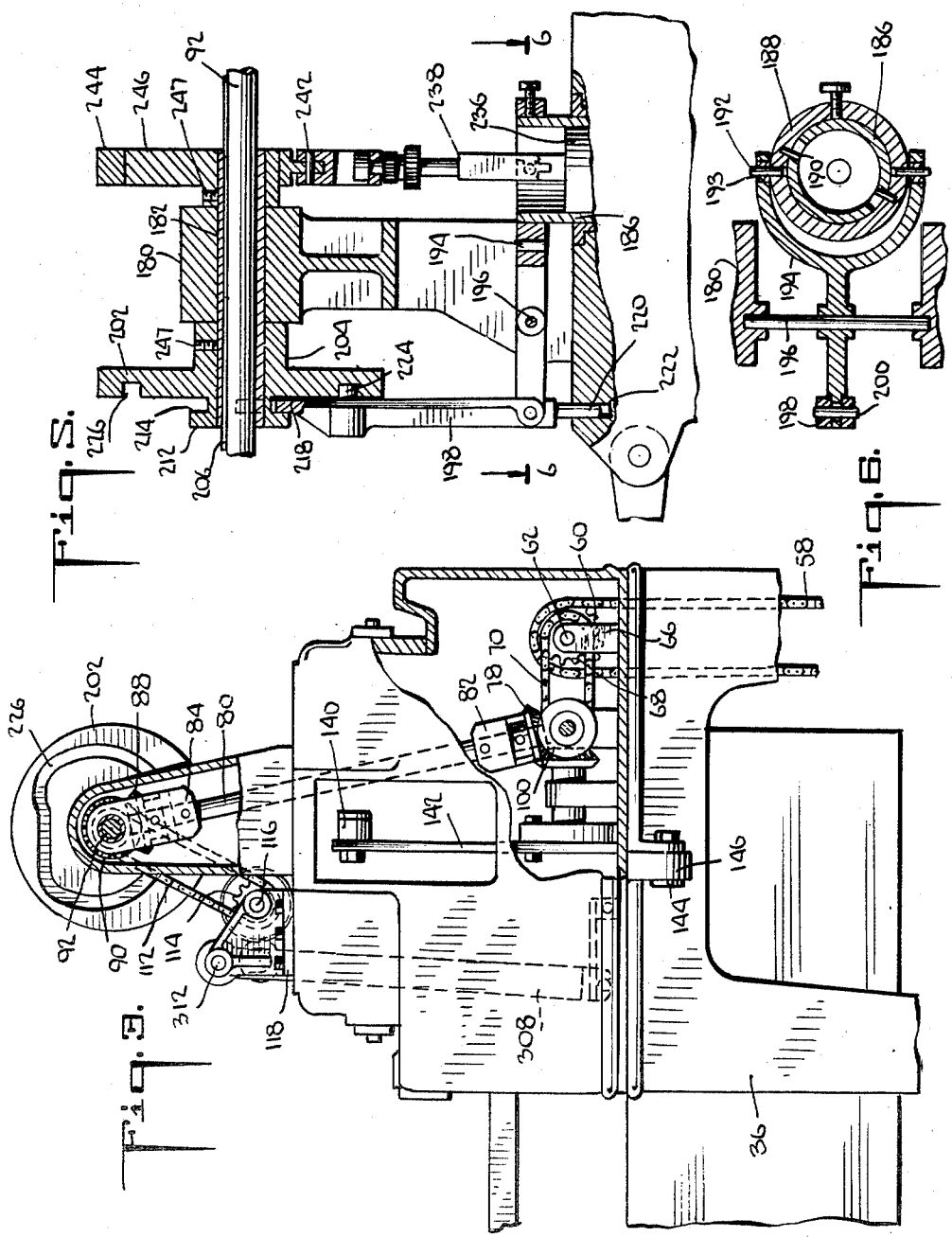
Fig. 3 is a side view of the machine, the same being fragmentary and showing only the extrusion portion and the nearby part of the frying portion; said view, moreover, is partly in section better to illustrate certain details of the drive.

The extrusion section is supported on a pair of pedestals 36 (Figs. 2 and 3) at opposite sides of the machine. Said section includes a frame 38 having legs 40 secured, as by bolts, to the pedestals 36 and carrying a bed 42. One side of the frame 38 is shaped in the form of a hollow casing 44 which houses sundry mechanisms for actuating the various elements of the extrusion and cooking sections.

The machine is driven by a single source of power such, for instance, as an electric motor 46 (Fig. 2) resting on a plate 48 spanning the feet of the pedestals 36. The motor drives a gear reduction mechanism 50, as through a chain 52. Said mechanism has an output shaft 54 on which a sprocket 56 is fixed. A chain 58 trained about the sprocket 56 includes a pair of vertical flights and engages an input sprocket 60 (Figs. 2, 3 and 7) secured to a horizontal back shaft 62 journalled in a pair of pedestal blocks 64, 66 on the base of the frame 38. Also fixed to the shaft 62 is a take off sprocket 68 engaged by a chain 70 that turns a sprocket 72 on a counter shaft 74 (see Fig. 7). It is from this shaft that the drives for the different parts of the extrusion section are taken.

The drive for the extrusion pump constitutes a bevel gear 76 fast on the shaft 74 and meshing with a mating bevel gear 78 (Figs. 2 and 3) secured to a vertical transmission shaft 80. The transmission shaft is suitably journalled as in bearing brackets 82, 84 carried by the casing 44. The upper end of the shaft 80 carries another bevel gear 88 which meshes with a bevel gear 90 secured to a cross shaft 92 that extends from one side to the other of the machine in the extrusion section above the bed 42.

The shaft 92 is journalled in a bearing 94 at one side of the machine above the casing 44 and in a bearing post 96 at the opposite side of the machine. Said cross shaft may have secured thereto a hand wheel 98 to expedite manual positioning of the sundry parts inasmuch as, since the various drives positively are taken off a common counter shaft 74, manual manipulation of any one of the drives will turn the remaining drives. It may be noted at this point that desirably the gear reduction box 50 includes a conventional clutch (not shown) which may be disengaged when it is desired to position the parts of the machine by manipulation of the hand wheel.

The drive for reciprocating the extrusion head constitutes a second bevel gear 100 (see Figs. 2 and 7) secured on the counter shaft 74 and meshing with a bevel gear 102 on a stub shaft 104 (Fig. 11) which is journalled in a bearing 106 carried in an angle bracket 108.

The drive for the dough strip cutting mechanism is taken off the cross shaft 92 and comprises a sprocket 110 (see Figs. 2, 3 and 8) affixed to said shaft and engaging a chain 112 that is trained about a second sprocket 114. The sprocket 114 is mounted on a stud shaft 116 journalled in a bearing bracket 118.

The last mechanism actuated by the counter shaft 74 is the conveyor drive shaft 120 (Fig. 7) which is turned by a chain 122 engaging a sprocket 124 on the shaft 74 and a sprocket 126 on the shaft 120.

The extrusion section 32 includes an extrusion head 128 (see Figs. 1, 2 and 4) which is mounted to travel from side to side of the machine on a pair of rails 130, 132. The head comprises a hollow base 134 having horizontal squat shafts 136 extending from opposite sides thereof in a direction perpendicular to the length of the rails. Said shafts provide journals for wheels 138 that track on the rails and thus serve to guide the head in its to-and-fro motion across the machine from side to side thereof.

A turnbuckle link 140 (Fig. 2) has one end pivotally connected by a horizontal pin 141 to the hollow base 134 and the other end pivotally connected by a horizontal pin 142 to a rocking lever 143. The lower end of the rocking lever carries a stud 144 (Fig. 11) journalled in a bearing 146 carried by the casing 44, the axis of the stud being perpendicular to the longitudinal axis of the rails. Said rocking lever is formed with an axial slot 148 in which a roller follower 150 is shiftable. The roller follower is eccentrically mounted on a disc 152 fixed to the shaft 104 so as to turn therewith.

The follower is held to the shaft by a threaded rod 154 and bolt 156, the former extending through a radial slot 158 in the disc in order to enable the eccentricity of the roller to be adjusted and thereby vary the angle through which the lever 142 rocks. In this manner, I am able to provide any desired length of travel for the extrusion head, the two extreme positions of the head being settable by altering the length of the turnbuckle lever.

The extrusion head further includes a pump housing 160 (Fig. 4) which conveniently is in the form of a Y-shaped casting. Said housing is formed with a pair of openings 162, 164 in its upper surface, which lead to downwardly extending passageways 166 that converge to an annular throat 168 around an extrusion pump 170. The pump housing also includes a vertical bore 172 above and in line with the center of the throat 168. A hopper 174 located above the housing 160 is provided with down spouts 176, 178 which snugly fit into the passageways 166 and thereby provide the necessary support for the hopper. The hopper desirably includes the aforesaid two feed channels communicating with the passageways 166 in order to distribute support for the hopper and provide a uniform distribution of dough in the extrusion pump 170.

A sliding connection is effected between the hollow base 134 and the rotating cross shaft 92 by a pedestal 180 (Figs. 2 and 5) bolted at its lower end to the base and provided at its upper end with a horizontal sleeve 182 in which the shaft is slidable. The sleeve turns freely in the pedestal.

The extrusion pump 170 includes a sleeve 184 (Fig. 4) which for convenience is made in two axially aligned parts that are screwed together. Said sleeve slidably receives a pump barrel 186. The upper end of the barrel is snugly secured in a ring 188 (see Figs. 4 and 6), the relative angular position of the sleeve and ring being fixed by a pair of diametrically opposite pins 190 extending radially away from the outer surface of the sleeve and received in slots opening on the bottom end of the ring.

The ring includes two diametrically opposite outwardly extending trunnions 192 registered on an axis which is perpendicular to the rails 130, 132. Said trunnions are received in slots 193 in the opposite arms of a yoke 194 journalled intermediate its ends on a horizontal shaft 196 parallel to the axes of the trunnions and supported by the pedestal 180 (see Figs. 2 and 6). The yoke acts as a walking beam, being oscillated by a pusher rod 198 (Figs. 5 and 6) to raise and lower the barrel 186.

The end of the yoke is slotted where it engages a horizontal pin 200 carried by the pusher rod and constituting the pivotal connection between the rod and yoke.

Means is provided to reciprocate the pusher rod from the drive shaft 92. Said means comprises a face cam 202 (Figs. 2, 3 and 5), the hub 204 of which is fast on the sleeve 182. Said sleeve is splined to receive a long key 206 that extends the length of the shaft 92, thus permitting the sleeve and cam to be slid along the shaft while maintaining operative engagement therewith. The outer side of the cam has a central boss 212 formed with an annular slot 214 in which the upper bifurcated end 218 of the pusher rod is freely vertically slidable. The lower end of the pusher rod includes a section 220 of reduced diameter slidable in a vertical bore 222 in the base 134. Thus, the pusher rod is constrained for vertical reciprocation only. Said pusher rod includes a follower 224 (Fig. 5) which travels in a face cam groove 226 shaped to give the proper movement to the barrel 186 as soon will be described.

The lower end of the barrel carries a spider 228, the hub 230 of which supports a downwardly extending valve stem 232 having an enlarged valve head 234 controlling discharge from the extrusion pump.

A piston 236 rides in the barrel 186. Said piston is driven through a connecting rod 238 of adjustable length. The lower end of the rod is pivotally connected as by a pin 240 to the upper end of the piston and the upper end of the connecting rod is connected as by a pin 242 to a strap follower 244 embracing an eccentric cam 246 fast on the sleeve 182.

Suitable means is included to anchor both cams 202, 246 to the pedestal 180 so that when the extrusion head is moved along the rails the cam will move with it. Desirably said means constitutes set screws 247 fastening the cams to the sleeve with the inner faces of the cams rubbing against the sides of the pedestal.

The annular throat 168 of the pump housing is formed with a central lower discharge opening 248 directly below the center of the barrel 186 and therefore in line with the valve head 234. The discharge opening constitutes the lower end of an upwardly extending flaring passageway 250 the upper end of which terminates at a seat 252 just below the annular throat 168.

Figure 4:
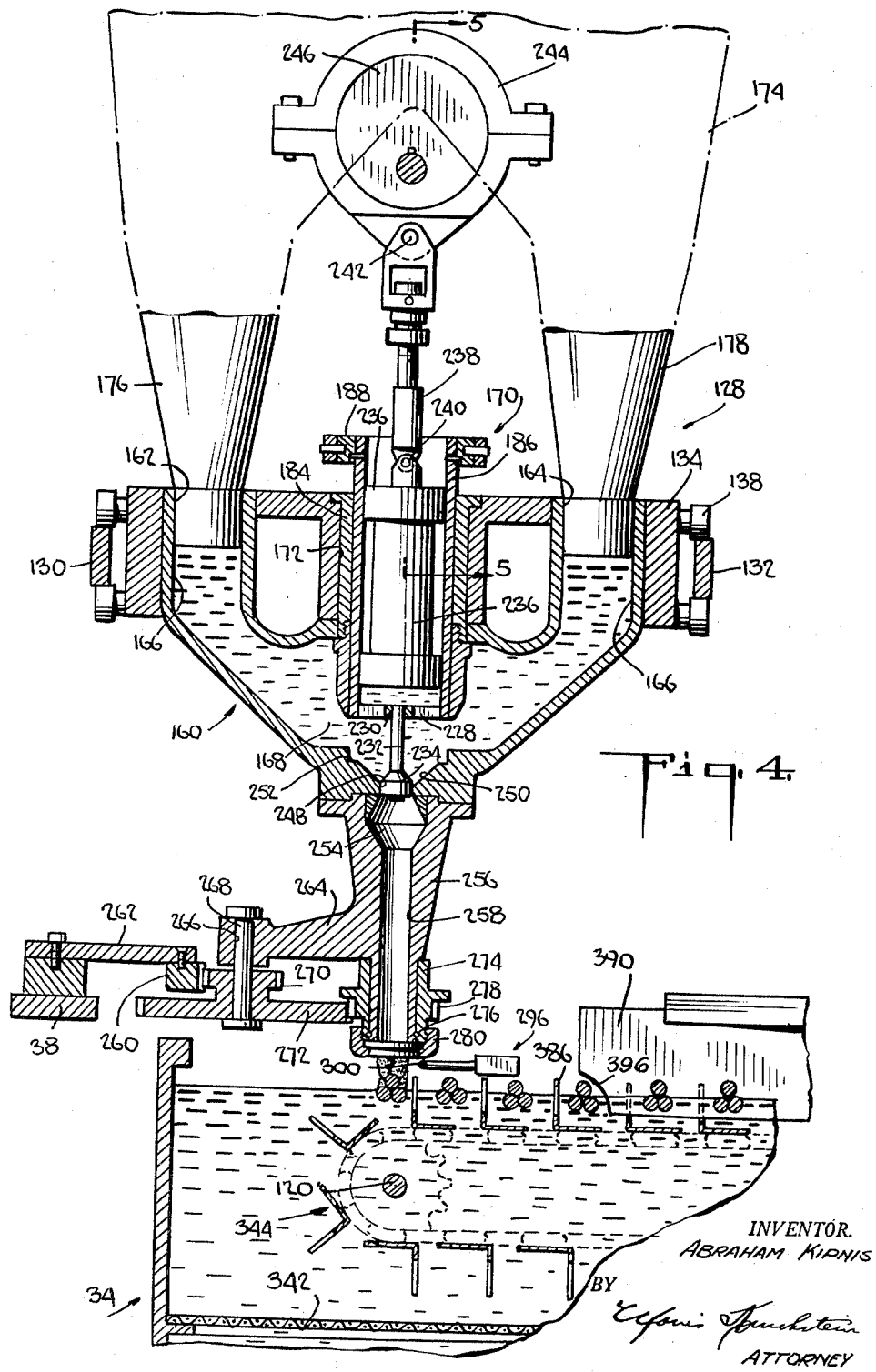
Fig. 4 is an enlarged sectional view taken substantially along the line 4—4 of Fig. 2, the same being explanatory of the construction of the extrusion pump.

The operation of the extrusion pump will best be understood by reference to Fig. 4. The pump is shown there at the end of an intake stroke. Where the extrusion head moves during delivery, as in forming twisted crullers and other elongated comestibles, the pump is in its illustrated position as it approaches the start of a dough extrusion pass. It will be noted that the piston and barrel are at the top of their strokes. Dough flowing down from the hopper under the force of gravity fills the annular throat, the discharge opening 248 being blocked by the valve head 234.

On the downward strokes of the piston and barrel, the cams 202, 246 are so shaped that the barrel moves down quickly to butt its lower end against the seat 252 and open the discharge valve while the piston still is near its uppermost position. This isolates the dough under the piston in the barrel from the dough in the remainder of the pump housing 160.

Thereafter, the piston, traveling more slowly, moves down in the barrel to force dough through the discharge opening. The barrel remains in its lowermost position throughout the extrusion of the dough and the start of the return, i.e. upward, stroke of the piston. Then the barrel quickly moves to the uppermost position in which the discharge opening is re-sealed and the passageway to the hopper re-opened to provide an entry port for infeed of the dough beneath the piston. Initial impetus is given to flow of the dough into the space beneath the piston by the partial vacuum formed by the previous slight upward movement of the piston in the still sealed barrel and as the piston continues to move upwardly it will aid in moving the dough. It will be noted that this arrangement provides a particularly large entry port and thus ensures complete and rapid filling of the space under the piston. Moreover, because the lower end of the entry port is coincident with the barrel seat, i.e. at the bottom of the barrel, the barrel will always be completely filled at the start of a delivery stroke.

The cams for the extrusion pump are so synchronized with the disc 152 for reciprocating the frame 134 that the barrel engages its seat 252 and the valve 234 is clear of the discharge port 248 just as the frame starts its extrusion pass.

Dough flowing through the discharge port 248 enters a chamber 254 at the upper end of an extrusion nozzle 256 secured, as by wing nuts 257 (Fig. 2), to the underside of the pump housing. It will be noted that the chamber 254 flares downwardly away from the discharge port 248. The flare angle is at least approximately equal to the angle of the upper face of the valve head 234 so that when said valve is in the chamber 254 in the open position of the discharge valve, ample room is provided for flow of the soft dough around the valve head. The lower portion of the chamber converges downwardly to an outfeed passageway 258 terminating at the lower tip of the extrusion nozzle.

Means is included to rotate the orifice of the nozzle as dough is extruded therethrough whereby to revolve the soft extruded product and thus provide the desired twisted configuration. Said means includes a rack gear 260 (Figs. 4 and 7) suitably supported as by rods 262 from the frame 38. Said rack gear is horizontal and in a plane somewhat above the discharge end of the extrusion nozzle. The nozzle is formed with an arm 264 that extends in the direction of the rack gear and supports a vertical bearing 266 in which a shaft 268 is journalled. Fixed to the shaft is a pinion 270 in mesh with the rack gear 260 and integral with a large gear 272. Thus, as the extrusion head travels along the rails 130, 132 during a delivery pass, the gear 272 will be rotated as it travels in a straight line.

A collar 274 is mounted for rotation around the lower end of the extrusion nozzle. The collar is suitably held in place as by a snap ring 276 (Fig. 12) and is formed with a gear 278 that meshes with the gear 272 so that, as the extrusion head reciprocates, the collar 274 will be rotated about the vertical axis of the nozzle.

The lower end of the collar is formed with a male screw thread that engages the female screw thread of a knurled clamping ring 280. Caught between the clamping ring and the lower end of the collar is a pattern extrusion die 282. Said die is in the shape of a shallow cup having an annular flange 284 pressed against the bottom of the collar 274 and a base provided with apertures 286 through which dough is extruded. The flange 284 has a through vertical opening 288 that receives a pin 290 carried by the clamping ring so that the die will turn with the collar 274 and thus impart the desired twisted shape to the plural strips of soft dough extruded through the apertures 286.

I so shape the die 282 that a highly attractive and unusual contour will be imparted to the finished twisted cruller. More particularly, I provide at least three openings 286 equiangularly spaced apart by triangular radial wedges 292 of the same shape as the openings, the wedges being connected by a central hub 294. Until the present time, manufacturers have been unable to produce a twisted cruller with more than two distinct, i.e. separate or unfused, baked intertwisted strips. I am able to produce a cruller with three or more intertwisted distinct strips, because of the shape and relative position of the openings and relative areas of the openings and wedges and because of the manner in which they are deposited in the deep frying bath. Heretofore where more than two strips were intertwisted, the strips have, at least partially, fused during the initial expansion undergone when the uncooked dough shape first encountered the hot deep frying bath. I prevent this by the relative proportioning of the areas of the openings and wedges as above described and by moving the extrusion head in a straight line as the dough strips are twisted instead of in an arc as heretofore. Such arcuate motion of the head tended to bring the strips into juxtaposition as they were laid in the hot bath. However, when the nozzle is moved linearly the previous tendency is avoided and instead there is a tendency to separate the strips as they are laid by because of attenuation caused by elongation of the strips as they are pulled across the bath.

As mentioned hereinabove, the machine 30 includes means for separating the elongated soft dough strip or strips being deposited in the hot bath so that, if desired, in a single extrusion pass two or more comestibles may be formed. Such means comprises a knife 296 (Figs. 1, 4, 7 and 14) including a wire cutting element 298 (Fig. 7) held taut between the legs of a U-shaped frame 300 carried by a staff 302. The staff extends transversely across the machine and has one end affixed to a slide bar 304 (Figs. 7 and 9) that is mounted for reciprocation in a direction perpendicular to the direction of travel of the extrusion head in a rectangular bearing 306. One end of the bar 304 is slotted to accommodate the lower end of a radius lever 308, the lower end of which is bifurcated. A pin 310 carried by the bar 304 and extending across the slot therein is slidably received between the two legs at the lower end of the radius lever. Said radius lever extends in a generally vertical direction and has its top end pivotally mounted for rotation about a horizontal axis parallel to the longitudinal axis of the support 302. For this purpose a shaft 312 is fixed in a bracket 314 on the casing 44. The upper end of the radius lever is formed with a bearing opening in which the shaft is received. A helical torsion spring 316 encircles the protruding end of the shaft 312. One end of the spring is anchored to the radius lever and the other end in a cap 318 held to the shaft 312 as by a set screw 320. The spring functions to bias the radius lever toward the frame 38, i.e., clockwise, as viewed in Fig. 8.

The drive shaft 116 (Figs. 8 and 10) for the severing mechanism mounts a pair of edge cams 322, 324 which are maintained separate by a spacer plate 326 having a diameter slightly larger than that of either cam. The cam 324 has a single depressed portion and the cam 322 two depressed portions. The radius lever is provided with a short transverse shaft 328 on which a roller follower 330 is free to turn or be shifted axially. The axial movement that may be experienced by the follower and which is limited by the head 332 at the tip of the shaft and the radius lever at the other end of the shaft is equal to the combined widths (see Fig. 10) of the two edge cams 322, 324 and the separator 326. The follower is urged against one or the other of the edge cams by the bias spring 316.

The cams 322, 324 principally consist of elevated dwell portions and as long as the follower is riding on these portions the knife is maintained in the position shown in Fig. 7 wherein the wire 298 is to one side of the path of travel of the extrusion nozzle 256. When, however, a depressed portion of the cam is reached, the follower shifts forward rapidly under the influence of the spring 316 causing the knife to snap toward the frame and immediately thereafter to retract to its former position as the radius lever again rides up onto the elevated dwell.

When the follower engages the cam 324 having but a single dwell, the foregoing cutting motion of the knife will take place only at the end of the delivery pass of the extrusion head, in which case it serves exactly to set the desired length of the cruller, and form a clean terminal and any additional dough which may leave the nozzle is cut and falls separately into the deep fry bath.

When the follower engages the cam 322 having two depressed portions, the knife will make two cutting strokes. Desirably, these two depressed portions are so spaced that one is located at a point in the cycle corresponding to the middle of the extrusion pass and the other at a point corresponding to the end of the extrusion pass, whereby an elongated edible uncooked article leaving the nozzle and being dropped into the hot deep fry bath will be cut once at its center and then trimmed at the end of the pass so as to make certain that two comestibles of predetermined length are formed and dropped in the bath. It will be understood, of course, that the number of low spots in the cam and the corresponding number of severing cuts made by the knife can be arranged in accordance with any desired length for the elongated comestibles.

To shift the roller follower 330 from one to the other of the edge cams, it merely is necessary manually to swing the radius lever away from the cams and slide the follower axially along its shaft 328 to line up with the one of the cams to be employed. The follower will remain in this position, being restrained against axial movement in one direction by the separator 326 and in the other direction either by the head 332 of the shaft or the radius lever.

The cooking section 34 basically comprises a long tank 334 and means 336 for transporting a series of comestibles through the tank toward the discharge end after they have been successively dropped into the tank by the extrusion head.

More particularly, the tank is elongated in a direction perpendicular to the direction of reciprocation of the extrusion head. The tank is designed to contain an edible frying oil such, for instance, as vegetable oil, lard or peanut oil, the same being maintained at an elevated temperature by a suitable source of heat, i.e., a steam coil 338, adjacent the bottom wall 340 of the tank. A removable foraminous plate 342, such as a screen, is located a short distance above the steam coils.

The means for transporting the comestibles through the tank includes a first, or front, conveyor 344 and a second, or rear, conveyor 346, said conveyors being supported by a side frame 348 extending from adjacent the deposit end for the comestibles to adjacent the discharge end.

The conveyor 344 includes a front axle which constitutes the conveyor drive shaft 120 and a rear axle 350. The front axle is journalled in bearings 352 (Fig. 7) attached to the side walls 354 of the tank. The forward end of the conveyor frame 348 is journalled to the conveyor drive shaft 120. The rear axle 350 is journalled in said frame 348. The front axle 356 and the rear axle 358 of the rear conveyor likewise are journalled in the frame 348.

The rear end of said frame is supported by a chain 360 (Fig. 1) whose lower end engages the frame and whose upper end is trained about a sprocket 362 that is turned by a hand wheel 364 through a worm gear 366. Said gear rotates with the hand wheel and meshes with a worm wheel 368 secured to the sprocket. The sprocket and worm wheel are journalled on a shaft 370 carried by a bracket 372 fast on a skeleton frame 374 supported from the floor or some other suitable external framework outside of the tank.

Figure 1:
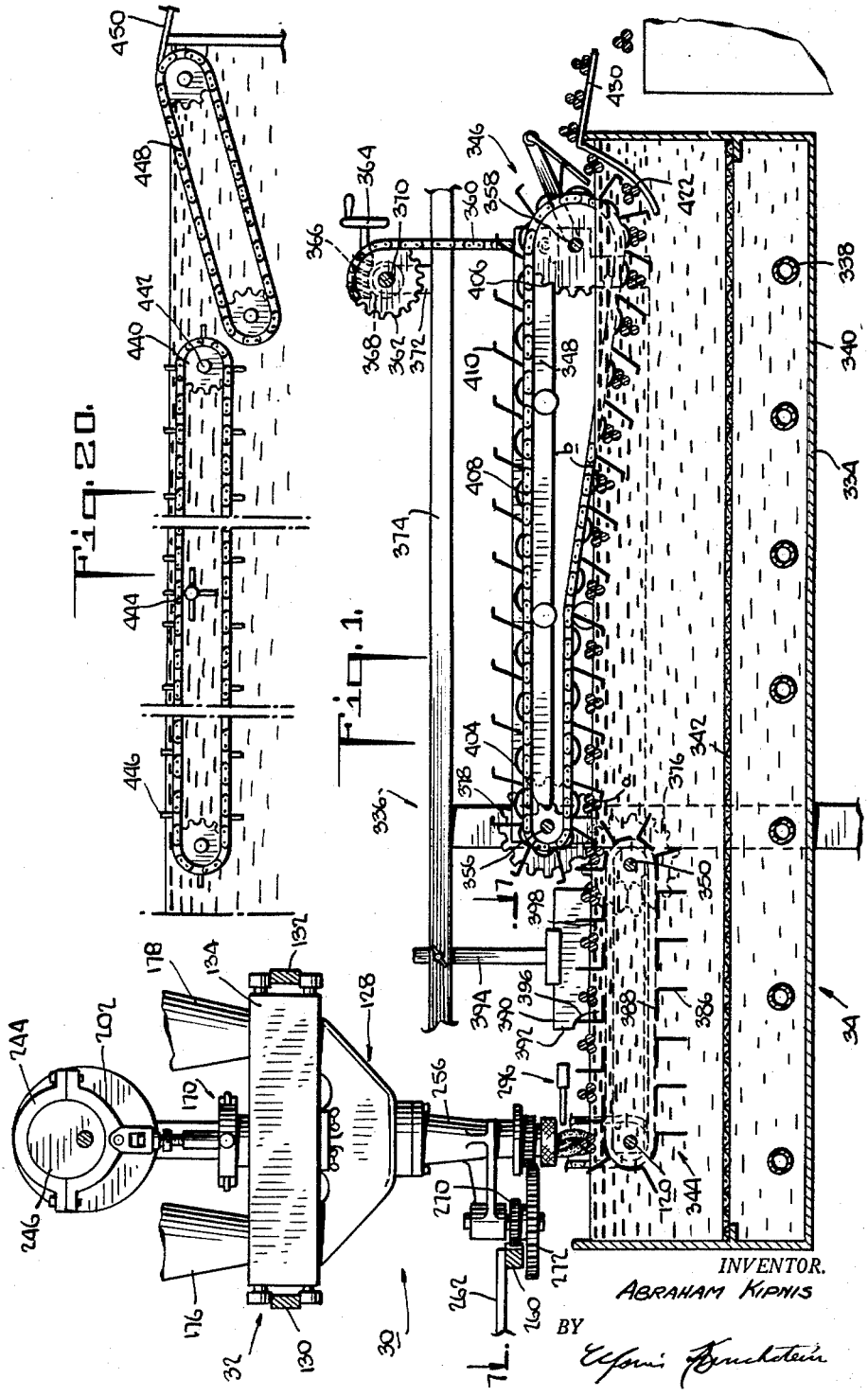

It thus will be appreciated that by manipulation of the hand wheel the frame 348 and with it the two conveyors can be swung about the conveyor drive shaft 120 from an operative lowermost position, such as shown in Fig. 1, to an elevated position. In this latter position, access to the conveyors for repair or replacement of parts is considerably simplified. Moreover, this gives the operator access to the inside of the tank for cleaning.

It will be observed that the foraminous plate prevents scraps of soft comestible material which may have dropped from the nozzle or which may have been trimmed from an end of the comestible from striking the very hot surfaces of the heating coil (or the very hot surface of the bottom 334 of the tank if the tank is externally heated), thus stopping the formation of encrusted carbonaceous deposits that are extremely difficult to remove. The screen, moreover, simplifies the cleaning of the tank by enabling the liquid to be drained out of the tank and the solid particles to be retained on the screen. The screen easily can be cleaned by sweeping a paddle across its upper surface.

The rear axle 350 of the front conveyor mounts a sprocket 376 (Fig. 7) which meshes with a sprocket 378 on the front axle 356 of the rear conveyor, thus providing power for driving the rear conveyor and ensuring synchronization of the two conveyors.

Adverting now to the front conveyor, side chains 380 (Fig. 7) are trained about sprockets 382, 384 on the front and rear axles thereof. Said chains support a plurality of regularly spaced, transversely disposed pushers 386 (Figs. 7, 14 and 15), each constituting a broad perforated metal plate having one end fixed to one of the side chains and the other to the other side chain. Pairs of consecutive pushers define compartments, each adapted to receive an individual elongated comestible which has been dropped in the hot deep frying bath by the reciprocating extrusion head. The perforations in the pushers permit the comestibles to be propelled with a minimum of force inasmuch as the liquid can stream through the openings. This is of some assistance in reducing the power requirements for the machines, but more important it lessens the compressive force exerted on the trailing sides of the soft comestibles and thereby minimizes distortion of the finished product. If desired, the compartments may be individualized by incorporating in each a bottom wall 388.

Should the elongated comestibles be subdivided into two or more pieces during traverse of the extrusion head by the knife 296, it is preferable to provide means in the cooking section 34 to prevent end-to-end comestibles which still are formed of soft dough from cohering before they have hardened by cooking. Such means constitutes a baffle wall 390 (Figs. 1 and 7) having a leading edge 392 immediately in back of the knife 296. The baffle wall extends longitudinally in the direction of travel of the front conveyor and where two elongated comestibles of equal length are being made is located at the middle of the path of the extrusion head, i.e. midway between the side chains 380 so that from the time the comestibles are dropped in the bath until the adjacent ends thereof have hardened sufficiently to prevent cohesion, they are maintained separate by the baffle wall.

The baffle wall is conveniently held in place in any suitable fashion as, for instance, by a supporting arm 394 adjustably fixed to the framework 374. It will be appreciated that if the knife is adjusted to cut only at the end of the extrusion stroke so that only a single elongated comestible is fashioned, the baffle wall is raised up out of the way. However, if more than two comestibles are made at each pass of the extrusion head, additional parallel baffle walls are utilized, the number of walls being one less than the number of comestibles dropped during each pass. The leading edge of the baffle wall itself can satisfactorily sever the comestible and thereafter maintain the ends of the resulting short piece spaced from one another until hardened. To enable the wall to be employed for such purpose, the leading lower corner 396 thereof is notched with the upper end of the notch located above the level at which the top of the just deposited comestible strip rides.

The lower edge 398 of the baffle wall is located beneath the surface of the hot liquid in the deep frying tank. Thereby, when a strip of soft dough is transported through the tank with its longitudinal axis perpendicular to the direction of travel of the conveyor 344 and perpendicular to the baffle wall 390, said strip will, upon meeting the baffle wall, be stressed locally by the corner 396. Since the strip still is soft and buoyant force is greater than the resistance to the strain, the strip will be severed. In order to enable the lower edge 398 of the baffle wall to extend beneath the surface of the hot fat in the tank, the pushers 386 are notched as at 400 (Figs. 14 and 15) to clear said wall.

The forward end of the rear conveyor 346 is located substantially above the rear end of the front conveyor 344. The rear conveyor includes a pair of spaced sprockets 404 on the front axle 356 and a pair of spaced sprockets 406 on the rear axle 358. The sprockets on the front and back axles are aligned and have side chains 408 (Figs. 1 and 16) trained thereabout. Said chains support a plurality of regularly spaced transversely disposed pushers 410 (Fig. 16), each consisting of a spine 412 that is connected at its opposite ends to the chains 408 and a set of fingers 414 extending outwardly away from the spine so that on the upper flight the fingers extend upwardly and on the lower flight the fingers extend downwardly. The tips 416 of the fingers are inclined at an angle to the longitudinal axes of the fingers, the inclination being such that the tips trail the fingers, that is to say, the tips extend away from the fingers in a direction opposite to that in which the chains 408 travel so that in the upper flight the tips extend toward the rear of the machine (see Fig. 1) and in the lower flight the tips extend toward the front of the machine.

The spacing between the successive pushers 410 is equal to that between successive pushers 386, and the chains of both conveyors move at the same linear speed. The pushers of the two conveyors are synchronized, and the front end of the rear conveyor is sufficiently low, taking into account the length of the fingers 44, for a comestible between a successive pair of pushers in the front conveyor to be transferred from the front to the rear conveyor so that the pushers of the rear conveyor take over the propulsion of the comestible, edging it forward from a position above it rather than below as in the case of the front conveyor. The purpose of this changeover soon will be apparent.

The chains 408 also carry between them and between each pair of pushers 410 a plate 418 which is approximately parallel to the chains. This plate serves to fill in the space between adjacent pushers at the chains. Said plate has many small perforations 420.

The pushers of the rear conveyor are so synchronously interrelated with the pushers of the front conveyor that the mere interaction of the two conveyors turns the comestibles over as they are transferred from the first to the second conveyor. More particularly, the rear conveyor is so adjusted that the distal end of the tip of each rear pusher 410 will, as it descends and nears the surface of the hot fat, strike the leading edge or a nearby portion of the comestible being propelled by a front pusher 386, said comestible after the transfer, being between the two pushers of the rear conveyor of which the leading pusher is the one the tip of which struck the comestible. At the moment that the aforesaid tip impinges on the comestible, the comestible still is being forced through the hot fat by the pusher of the front conveyor. Therefore, upon further movement of the two pushers, the pusher of the rear conveyor, which at this time is moving in a downward as well as a rearward direction, will depress the leading edge of the comestible. Inasmuch as the comestible is being propelled through the liquid at the same time that its leading edge is being submerged, a point soon will be reached where the comestible is in unstable equilibrium so that the comestible thereupon will turn upside down. This position is illustrated by the comestible a in the rear conveyor in Fig. 1.

At about this time the comestible leaves the front conveyor and floats between two pushers in the rear conveyor. The now uppermost portion of the comestible has been set after being cooked in the hot fat during its travel through the front conveyor. The under part of the inverted comestible is, however, still soft. For the initial part of the travel in the rear conveyor, the comestible floats on the surface of the fat in the tank and during this period the underportion of the comestible likewise is set. It will be noted that during the two setting operations the material of the comestible conventionally will swell so as to assume the plump form conventional in crullers and doughnuts. Thereafter, the path of travel of the chain dips beneath the surface of the fat, as at the point b in Fig. 1. The crullers, accordingly, will be submerged beneath such surface and will be cooked to the desired degree before being discharged. It will be observed that the perforations in the plates 418 permit the cruller to ride in close and intimate contact with the plates so that the crullers will be level during their submerged travel and thus will be cooked to a desired uniform shade.

At the extreme rear end of the second conveyor, i.e. at the sprockets 406, the chains 408, pushers and plates stop their downward descent and begin to rise sharply. At this time the tips 416 of the fingers 414 travel along a deflector plate 422 (Figs. 1 and 17) which prevents the crullers from slipping away from the pusher plate as it rises upward through the fat. It will be recalled that the parallel fingers 414 of the pushers in the rear conveyor are spaced apart axially of the sprocket axles 356, 358. This mutual positioning has the advantage of minimizing the effort required to move the pushers through the fat and the further advantage of creating less disturbance in the fat, so that the crullers tend to rest gently against the leading faces of the pushers.

At the discharge end of the machine I provide stripping fingers 424 designed to enter the spaces between the pusher fingers 414. The stripping fingers are carried by a comb rack 426 supported on arms 428 mounted on the frame 374 adjacent the ends of the axle 358. Said stripping fingers extend rearwardly and downwardly from the comb rack 426. Thus, as the comestibles are raised up the deflector plate, they will encounter the stripping fingers and be cammed rearwardly thereby, over and onto a discharge plate 430.

In the operation of the machine, assuming the hopper to be full, the cooking fat in the tank to be at the proper temperature, and the shaft 62 to be at the start of a cycle, the frame 134 will be at its extreme position of travel closest to the casing 44; the knife 296 will be in the position indicated in Fig. 7 which is forward of the path of travel of the extrusion nozzle; the barrel 186 will be in its extreme lowermost position; the piston 236 will be slightly below its extreme uppermost position; and the upper flight of the front conveyor chain will have a pusher 386 just forward of the extrusion nozzle. As the shaft 62 turns, the extrusion head will start to move out across the tank. Concurrently, the piston will force dough past the discharge valve 234 and through the outfeed passageway 258 to the die 282, so that soft strips of dough will be extruded from the nozzle and laid in the hot fat in the tank. As the extrusion head is moving outwardly, i.e. away from the casing 44, the die will be revolved through its train of driving gears whereby to twist the three strips being extruded. As the head approaches its extreme outward limit of travel, the knife 296 will be quickly moved under the discharge nozzle and then back again to cut off the terminal end of the extruded strands. At substantially the same time, the direction of travel of the piston 236 will be reversed and the barrel 186 started on its upward travel. The direction of travel of the head 134 then is reversed and during return movement thereof the barrel is raised and the piston is raising, permitting dough to flow down into the throat of the extrusion pump. Before the head reaches its starting point, the barrel again begins its downward movement so that when the pump is readied for a fresh extrusion stroke, the barrel has its lower end resting against the seat 252.

If the knife 296 is employed to make plural cuts, a different wire 298 is substituted for the wire shown in Fig. 7, and the knife frame 300 is lengthened so that the wire can intersect the strips issuing from the extrusion nozzle in the different locations of said nozzle at the times of cutting.

The machine 30 is so constructed that it also can make doughnuts. To this end the tank 334 is wider than is necessary for the manufacture of crullers only, thereby providing a space alongside the cruller conveyors for a doughnut conveyor 432 (Fig. 7). Said conveyor is largely conventional and includes two side chains 434, 436 trained about a forward pair of sprockets 438 on the shaft 120 and a rear pair of sprockets 440 (Fig. 20) mounted on an axle 442 journalled in the side frame 348. At a point intermediate the two ends of the doughnut conveyor, I locate a standard flipover paddle wheel 444 driven by a sprocket (not shown) that meshes with the upper flight of the side chain 434.

The side chains carry a series of spaced pushers 446, the paddle wheel being timed to rise up from the fat in the tank and turn over a doughnut in the space between two adjacent pushers, as the doughnut passes over the wheel.

At the discharge end of the machine the doughnuts are transferred from the first doughnut conveyor to a second doughnut ramp conveyor 448 which lifts the doughnuts out of the tank to a discharge plate 450.

The frame 134 of the extrusion head is held stationary when doughnuts are being made. Accordingly, the turnbuckle link 140 is disconnected as by removing the pin 141. The frame head then is shifted to align the extrusion nozzle of the pump with the doughnut conveyor. The frame is held in this position by passing the pin 141 through registered apertures in the frames 38, 134.

The extrusion nozzle 256 shown in Fig. 4 is not suitable for the production of doughnuts. This nozzle, which is held in place by wing nuts 452 (Fig. 2), is removed and a doughnut nozzle 454 (Fig. 19) substituted in place thereof. The doughnut nozzle includes a discharge tube 456 having a discharge passageway 458 beneath and connected with the discharge opening 248 of the extrusion pump. The valve stem 232 carries a downwardly extending rod 460 at whose lower end is provided a doughnut valve head 462. The latter includes an outward annular flange 464 that snugly fits in and closes the lower end of the passageway 458 when the valve head 234 closes the discharge opening 248. However, when the piston 236 has moved down sufficiently far for the valve head to clear the discharge opening, the doughnut valve head likewise will have moved down to unblock the passageway 458. This permits dough to be forced through the discharge orifice 466 of the doughnut extrusion nozzle. However, the dough does not flow downwardly unobstructed inasmuch as it must pass over the doughnut valve head 462 which directs the dough radially outwardly and leaves a large annular opening 467.

At the end of an extrusion stroke, the doughnut valve head is raised, cutting off the flow of dough and finishing the annular shape of the raw doughnut. At the same time, it cuts off the shape from the dough in the discharge passageway, thus allowing the soft doughnut to drop down into the hot fat in the tank. The front doughnut conveyor is so timed with the operation of the extrusion pump that at the moment of separation of the soft annular dough form a pair of pushers is arranged ahead of and behind the extrusion pump ready to receive the raw doughnut.

It will be appreciated that, if desired, I may employ two extrusion pumps at the same time, both driven from the shaft 92. Thus, in Fig. 2 I have illustrated a second pump 468 in dot-and-dash lines. Thus, in the same machine and at the same time, I am able both to make crullers and doughnuts. Moreover, without any substantial modification, the machine can be arranged to utilize two or more cruller heads at the same time, all of the heads being identical with the cruller head already described and being linked together for joint movement. This will necessitate the provision of a like plurality of cutting mechanism and cruller conveying mechanism in the tank.

It will be seen that despite the addition of plural conveying mechanisms in the tank, the machine does not become unduly large, inasmuch as all of the mechanisms can be placed close together and do not diverge from one another as they would if employed in conjunction with an extrusion pump which experienced an arcuate movement rather than a linear movement during extrusion.

It thus will be seen that I have provided a machine which achieves the several objects of my invention and is well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described my invention, I claim as new and desire to secure by Letters Patent:

1. In a machine of the character described including a dough extrusion pump and a tank for containing a bath of hot fat beneath the pump: means mounting the pump for movement in a straight line over the tank, said pump having a discharge opening, means continuously operating the pump as it passes over the tank in one direction to continuously discharge dough from said opening during such movement of the pump over the tank in said direction, means mounting a die over said opening for rotation about a vertical axis, said die having plural openings therethrough so that plural strips of dough are simultaneously extruded, and means for rotating said die about said axis as the pump is moved whereby plural inter-twisted dough strips will be laid in a straight line in the hot fat.

2. In a machine of the character described, means depositing in a liquid-containing frying tank a series of transversely registered elongated pieces of soft dough, means to move the pieces sidewise through the tank, and a vertical stationary knife having a portion above the liquid in the tank to sever one after another of said pieces intermediate their ends, said knife having its lower edge below the surface of the liquid in said tank and being located to sever the pieces after they have been deposited in the tank and before the skins of the pieces have been hardened.

3. A combination as set forth in claim 2 wherein the lower front corner of the knife which engages the pieces to sever the same is notched.

4. In a machine of the character described, a dough extrusion pump including an extrusion outlet directly vertically below the same, means mounting said pump for reciprocation in a straight line over a liquid-containing frying tank, means for continuously driving said pump as it passes over the tank in one direction so as to cause continuous extrusion to take place during movement of the pump over the tank in said direction so as to deposit in said tank a series of transversely registered elongated pieces of soft dough, means to move the pieces sidewise through the tank, and a vertical stationary knife having a portion above the liquid in the tank to sever one after another of said pieces intermediate their ends, said knife having its lower edge below the surface of the liquid in said tank and being located to sever the pieces after they have been deposited in the tank and before the skins of the pieces have been hardened.

5. In a machine of the character described, a dough extrusion pump including an extrusion outlet directly vertically below the same, means mounting said pump for reciprocation in a straight line over a liquid-containing frying tank, and means for continuously driving said pump as it passes over the tank in one direction so as to cause continuous extrusion to take place during movement of the pump over the tank in said direction.

6. A combination as set forth in claim 5 wherein the means for continuously driving said pump during movement of the pump over the tank in one direction includes a non-circular shaft extending parallel to such direction of movement of the pump, and a member in the pump having a matching non-circular opening slidable on said shaft and operatively engaging the same.

References Cited in the file of this patent

UNITED STATES PATENTS

| | | |
|---|---|---|
| 559,323 | Drake | Apr. 28, 1896 |
| 1,382,926 | Mitchell | June 28, 1921 |
| 1,416,735 | Morris | May 23, 1922 |
| 1,776,781 | Carpenter | Sept. 30, 1930 |
| 1,814,930 | Hunter | July 14, 1931 |
| 1,870,654 | Schoel | Aug. 9, 1932 |
| 1,880,459 | Morris | Oct. 4, 1932 |
| 1,927,786 | Hunter | Sept. 19, 1933 |
| 2,003,617 | Toews | June 4, 1935 |
| 2,032,468 | Carpenter | Mar. 3, 1936 |
| 2,042,655 | Ferry | June 2, 1936 |
| 2,083,829 | Carpenter | June 15, 1937 |
| 2,089,158 | Bergner | Aug. 3, 1937 |
| 2,121,128 | Loose et al. | June 21, 1938 |
| 2,144,182 | Ellis | Jan. 17, 1939 |
| 2,176,079 | Katzman | Oct. 17, 1939 |
| 2,229,167 | Carpenter | Jan. 21, 1941 |
| 2,231,667 | Gunsolley | Feb. 11, 1941 |
| 2,256,617 | Kipnis | Sept. 23, 1941 |
| 2,319,561 | Scharsch | May 18, 1943 |
| 2,463,112 | Kipnis | Mar. 1, 1949 |
| 2,584,584 | Hoffman et al. | Feb. 5, 1952 |